(12) United States Patent
Villapudua

(10) Patent No.: US 7,240,032 B2
(45) Date of Patent: Jul. 3, 2007

(54) CUSTOMER PRIVACY PROTECTION SYSTEMS AND METHODS

(75) Inventor: Missy L. Villapudua, Elizabeth, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 10/027,696

(22) Filed: Dec. 20, 2001

(65) Prior Publication Data

US 2003/0120498 A1 Jun. 26, 2003

(51) Int. Cl.
G06Q 40/00 (2006.01)

(52) U.S. Cl. ............................................. 705/40; 705/1

(58) Field of Classification Search .................. 705/26, 705/1, 40, 41, 42, 44, 43, 14, 39
See application file for complete search history.

(56) References Cited

U.S. PATENT DOCUMENTS

| | | | | |
|---|---|---|---|---|
| 5,727,249 | A * | 3/1998 | Pollin | 705/26 |
| 6,029,153 | A * | 2/2000 | Bauchner et al. | 705/42 |
| 6,032,136 | A * | 2/2000 | Brake et al. | 705/41 |
| 6,098,879 | A * | 8/2000 | Terranova | 235/384 |
| 6,275,824 | B1 * | 8/2001 | O'Flaherty et al. | 707/9 |
| 6,493,685 | B1 * | 12/2002 | Ensel et al. | 705/40 |
| 6,546,373 | B1 * | 4/2003 | Cerra | 705/19 |
| 6,594,647 | B1 * | 7/2003 | Randle et al. | 705/77 |
| 2001/0011247 | A1 * | 8/2001 | O'Flaherty et al. | 705/39 |
| 2002/0087472 | A1 * | 7/2002 | Walter | 705/41 |
| 2003/0018587 | A1 * | 1/2003 | Althoff et al. | 705/26 |

FOREIGN PATENT DOCUMENTS

JP 2002-259693 A * 9/2002

OTHER PUBLICATIONS

Unknown Author, "Privacy at NetBank", Aug. 29, 2001, 7 pages, available at www.netbank.com/security_privacy.htm.*
Unknown Author, "Providian Helps Set Benchmark for Smart Card Industy", Jun. 2001, 2 pages, available at http://home.providian.com/Press-Releases/06-12-2001.htm.*
Heidi Dalley, "Millions Served: Java Card Technology", May 2001, 2 pages, available at http://java.sun.com/features/2001/05/cardtech.html.*

* cited by examiner

Primary Examiner—Thomas A. Dixon
(74) Attorney, Agent, or Firm—Townsend and Townsend and Crew LLP

(57) ABSTRACT

A method for protecting consumer personal data by giving the consumer a choice of privacy preferences linked to their financial payment instruments such as credit cards, checks and the like. The privacy preference data is stored electronically in a database and on the payment instrument.

9 Claims, 3 Drawing Sheets

CUSTOMER PRIVACY PROTECTION SYSTEMS AND METHODS

BACKGROUND OF THE INVENTION

This invention relates generally to the field of consumer privacy, and in particular to techniques and systems to protect consumer personal data.

Consumers have long sought to protect their personal data while companies have sought to use such data for marketing and other purposes. For example, credit cards, debit cards, smart cards, and the like often include stored information about the owner of the card. This information can include, for example, the owner's name, address, telephone number, and the like. Each time the card is used for a purchase, this information can be extracted from the card by the merchant. This information may then be used to target marketing material to the consumer. Further, the issuing bank also keeps a record of such information. As such, this information may be used by the bank to direct marketing materials to their customers.

Consumers have often objected to such use of their personal information. As such, the Gramm Leach Bliley Act was enacted to regulate the use of such information. Hence, it is hoped that companies and banks will become more conscience and consumer friendly with respect to how customer information is used.

This invention is related to ways to permit companies and banks to use such personal data, while also giving the consumer the option of limiting such use.

BRIEF SUMMARY OF THE INVENTION

The invention provides various techniques and systems to protect consumer personal data. According to one embodiment, such a process is initiated when a consumer applies for a new payment instrument, such as a credit, debit, or smart card, a check, or the like. When making the application, the consumer provides their personal data and indicates a privacy preference. This information is then stored electronically in a database or other storage location. When the payment instrument is initialized, the privacy preference is also stored on the payment instrument. In this way, each time the database is accessed, or when the payment instrument is used to make a purchase, the privacy preference information is made available. Hence, if the consumer indicates that he or she would not like to receive any marketing offers, that information may be provided to the merchant, the issuing bank, any merchant banks, marketing groups and the like.

The consumer may indicate a wide variety of privacy preferences. For example, consumers may indicate that they would like to receive offers only from merchants that the consumers do business with, or with such merchants and their affiliates. As another example, it may be for only banks that the consumers do business with. As another option, it may indicate that no marketing offers are to be provided.

The privacy preference may be stored on the payment instrument using a variety of techniques. For example, it may be stored in a smart card chip, a magnetic stripe, a MICR line of a check, and the like. When making a purchase, this information is electronically read by the merchant, such as by a point of sale device, and may also be stored by the merchant. In this way, when the merchant accesses this information for marketing purposes, the merchant will also see the privacy preference. In a similar manner, the privacy preference may be transmitted to the merchant's bank when a purchase is made so that the merchant bank will also have the privacy preference. Further, the privacy preference may also be stored in other databases, such as those associated with a credit card issuer/processor, the consumer's bank, and the like. In this way, these organizations may be provided with the privacy preferences as well.

Another way to protect consumer personal data is by providing systems that permit consumers to enter their privacy preferences. In this way, consumers' desires may be stored in databases when they already have payment instruments. For example, a web site may be offered where such information may be electrically input into a server computer and then stored in a database.

DETAILED DESCRIPTION OF THE INVENTION

The invention provides various systems and techniques for protecting consumer personal data. Such data may include, for example, name, address, phone number, e-mail address, social security number, credit rating, income level, sex, marital status, employer, past financial or credit transactions, and the like. Such personal data may be collected in connection with the application for a financial or payment instrument, such as a credit card, debit card, smart card, stored value card, phone card, internet card, checks, and the like. For example, in many cases a consumer is required to fill out an application that requests such information before the financial instrument will be issued. This information is saved by the issuing organization and may be subsequently used for marketing purposes.

The invention provides for the protection of such data by collecting privacy preference information from the consumer. The privacy preference information may be collected either at the time of application or after the financial instrument has been issued. Once collected, the privacy preferences may be stored in a database or other storage medium, on the financial instrument, or both. In some cases, the information stored on the financial instrument may be read when making a transaction and then stored by the merchant, the merchant's bank, or other organization having access to the information.

By collecting and storing the privacy preferences, companies or organizations that access the personal data may also be provided with the privacy preferences. As such, when providing the consumer with marketing information, promotions, offers, advertisements, and the like, the privacy preferences are available so that the consumer's privacy requests may be honored.

Figure 1:
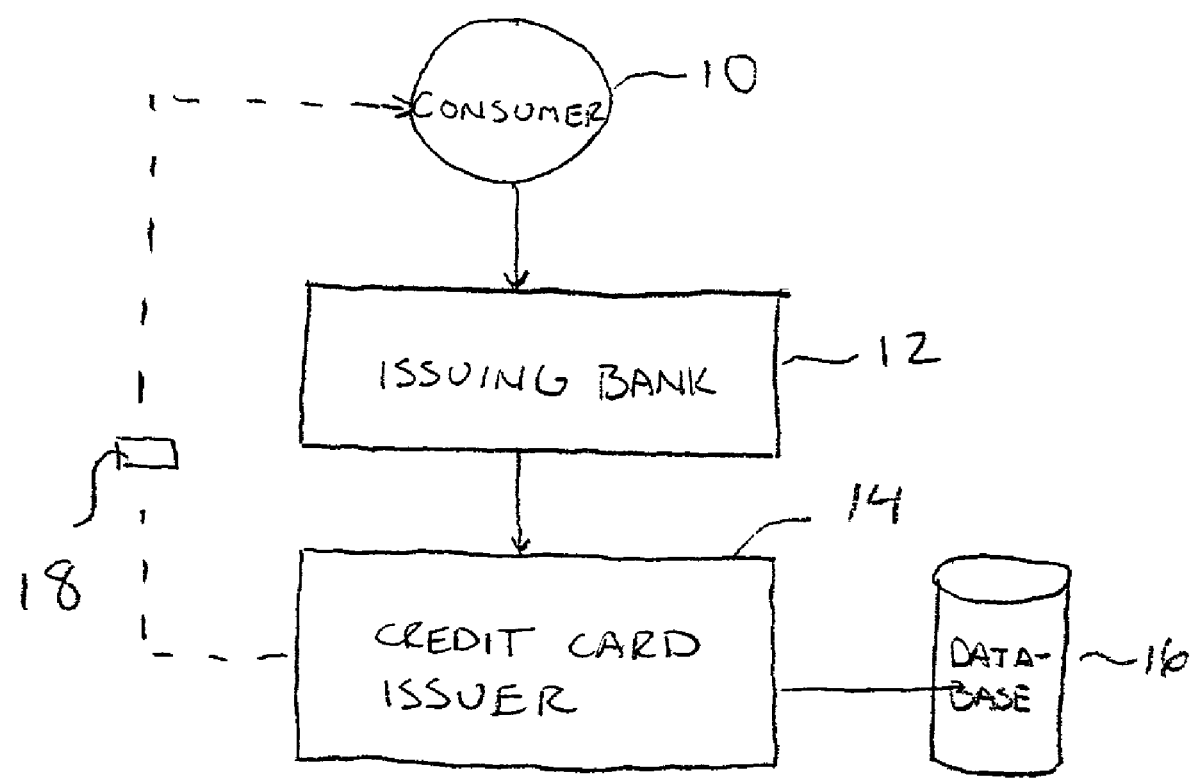
FIG. 1 is a schematic diagram illustrating one processing for issuing a credit card.

Referring now to FIG. 1, one process for issuing a financial instrument, such as a credit card, will be described in order to show how privacy preferences may be collected. To obtain a credit card, a consumer 10 contacts an issuing bank 12 or other organization that issues financial instruments. The bank 12 elicits information from consumer 10 that is necessary to issue the credit card. This process may proceed by having the consumer physically fill out an application form (paper or electronic) and submit this to bank 12. Alternatively, such information may be provided over the phone to a customer service representative. The bank 12 may then issue the card after confirming that the consumer meets the application criteria. Alternatively, as shown in FIG. 1, bank 12 may utilize a credit card issuer 14 to actually issue the card. One example of such an issuer is First Data Corporation. In either case, the application information is stored in a database 16 and the credit card is created and mailed to the consumer 10. To create the credit card, a blank card is embossed and initialized by storing account and other personal data on the magnetic stripe. Following this step, the card may be matched with a card carrier and combined with one or more of the following: letters, inserts, advertisements, offers, and the like. This packet is placed into an envelope and mailed as shown at step 18.

Figure 2:
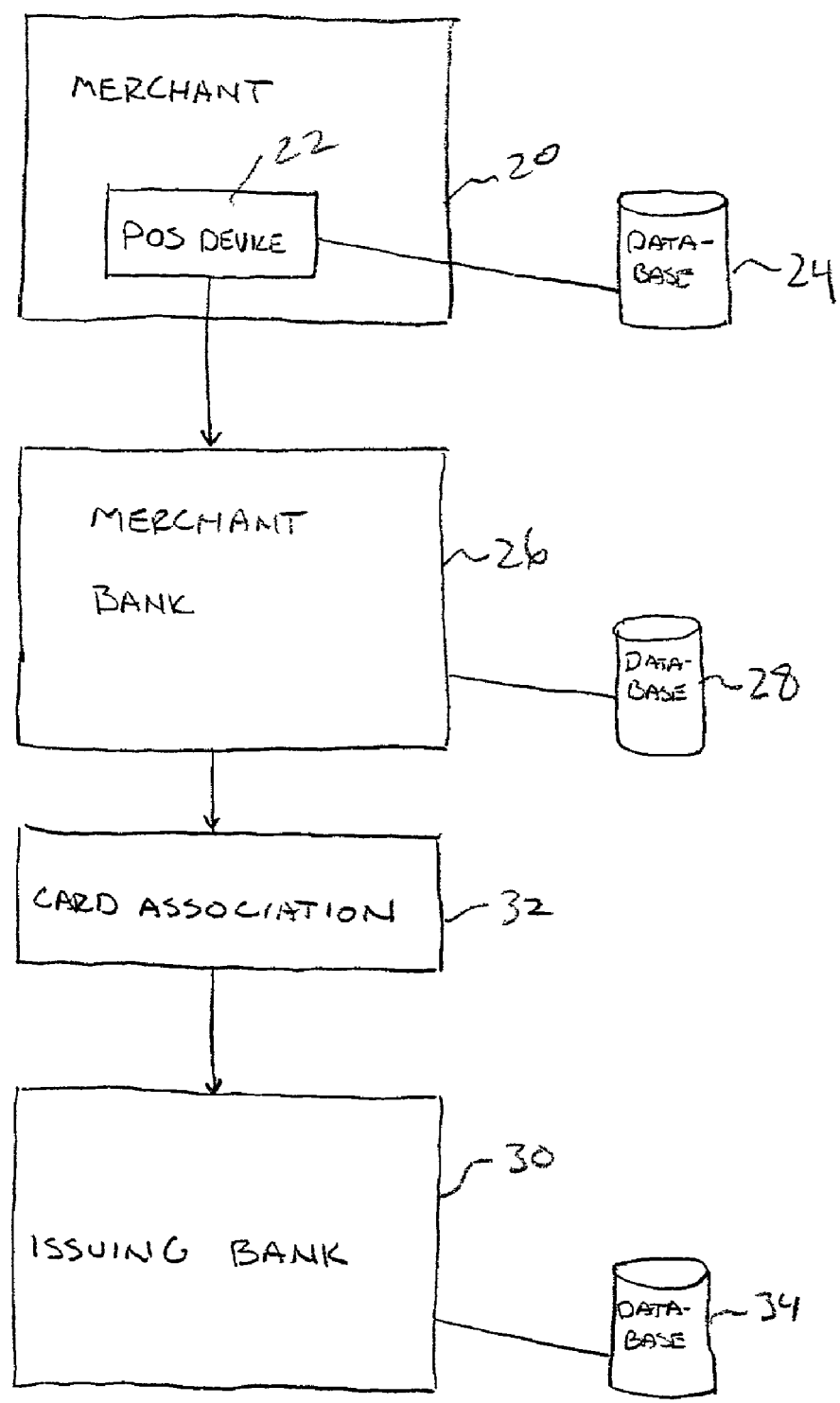
FIG. 2 is a schematic diagram illustrating the flow of information when making a credit card transaction.

FIG. 2 illustrates the data flow when the credit card is used to make a purchase. In this example, a purchase is made at a merchant location 20 using a point of sale device 22. Examples of such point of sale devices are described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference. Point of sale device 22 reads account and other personal information from the magnetic stripe of the card in order to process the transaction. In some cases, the merchant may also save this personal information in a database 24 for future marketing purposes.

Point of sale device 22 transmits the transaction information to the merchant's bank 26 for payment to merchant 20. The functions provided by merchant bank 26 may be done internally or by a separate processing organization. The transaction information is stored in a database 28. This information may include the name of the merchant, the transaction amount, any consumer personal data read from the magnetic stripe, and the like. Once stored in database 28, this information may also be used for marketing purposes.

To receive payment, merchant bank 26 sends a request for payment to the consumer's issuing bank 30. This may optionally be done through a credit card association 32, such as MasterCard or VISA. Issuing bank 30 may also store the transaction information in a database 34 so that the consumer may be billed for the purchase upon issuance of a statement. The information in database 34 may also include other personal data on the consumer since issuing bank 30 issued the credit card. Hence, in some cases database 34 may be the same database, or have the same information contained in database 16 (see FIG. 1). As such, this information may potentially be used for marketing purposes as well. Although not shown, a similar process may be used when a check is presented as the form of payment. In such cases, the check passes through the Federal Reserve System rather than through card association 32. A scanner or other input device may be used to collect consumer personal data which may then be stored for marketing purposes in a manner similar to that just described.

Figure 3:
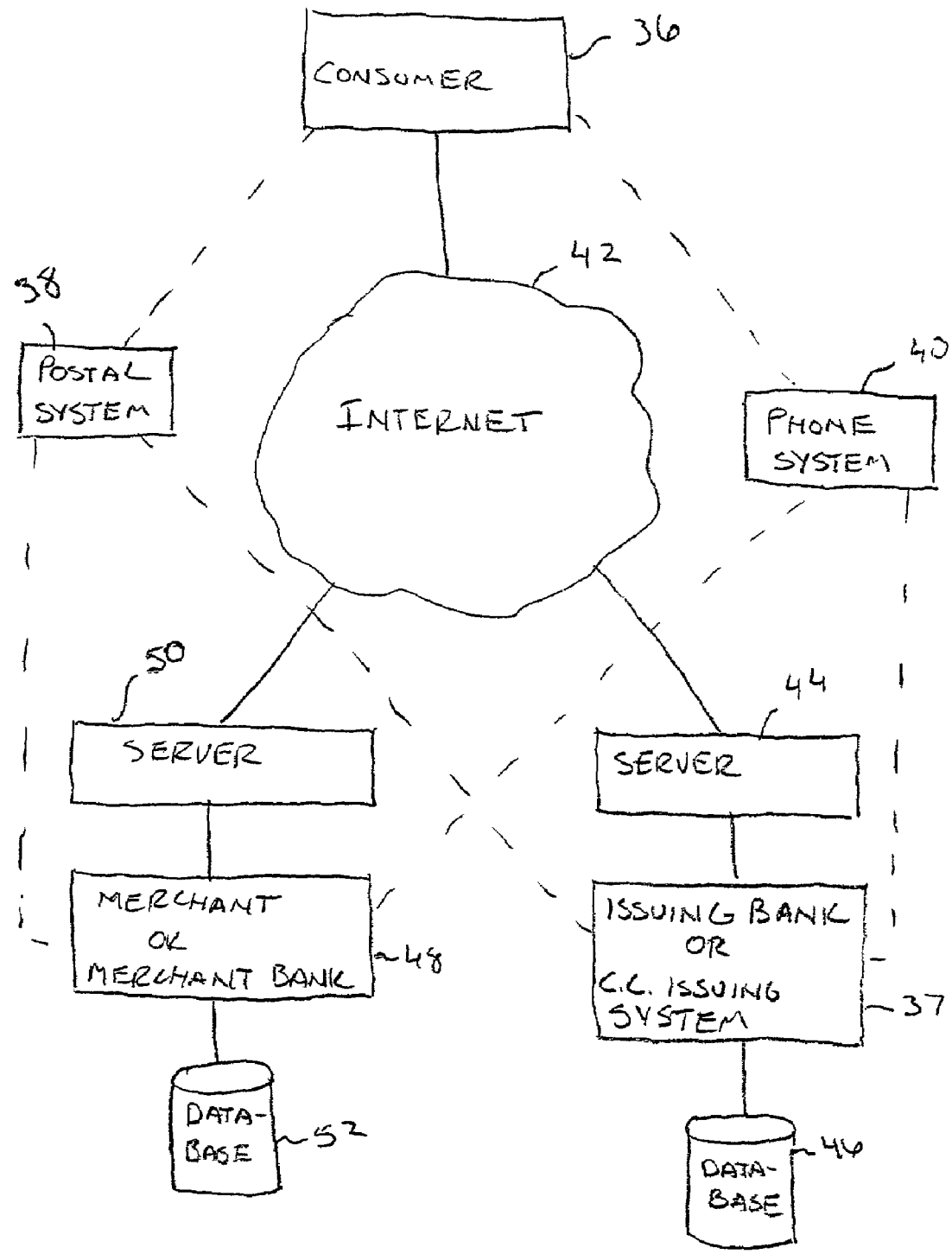
FIG. 3 is a schematic diagram illustrating various techniques for protecting consumer personal data.

To protect the consumer's personal data as it passes through the various systems, the processes illustrated in FIG. 3 may be employed. One way to protect the personal data of a consumer 36 is to gather the consumer's privacy preference when applying for a financial instrument such as a credit card or check. When applying for a financial instrument, an issuing bank 37 may be contacted in a variety of ways, such as by an in-person visit, by a postal or package delivery system 38, by a phone system, by the Internet 42, and the like. For example, the consumer may fill out an application and mail it to the financial institution or simply call a customer service representative with the information. When using Internet 42 the application may be produced on a display screen of consumer 36 provided by server computer 44 as is known in the art.

A wide variety of privacy preferences may be provided to consumer 36. For example, consumer 36 may be asked whether he or she would like to receive offers only from merchants the consumer 36 does business with. This question could also be extended to affiliates of such merchants. As another example, consumer 36 may be asked whether he or she wishes to receive offers from the bank he or she does business with. Further, consumer 36 may indicate that he or she does not want to receive any marketing materials. Once this information has been gathered by bank 37 it is stored in a database 46. Further, when producing the credit card, the privacy preference may be stored on the magnetic stripe so that anyone having access to the information stored on the magnetic stripe will know of the privacy preference.

In FIG. 3, bank 37 and a credit card issuing system are shown together. However, it will be appreciated that these may be separate organizations that share information, including the information stored in database 46. In this way, if bank 37 or any of its affiliates or other contractors wishes to send consumer 36 marketing material, they may first evaluate the consumer's privacy preference. If the privacy preference indicates that the marketing material is not wanted, the material may be prevented from being sent.

If the financial instrument is a check, the privacy preference may be stored on the check, such as in an enhanced MICR number. In this way, consumers with checking accounts may be protected as well. Further, such information could also be stored on debit cards, smart cards, stored value cards and the like. When making a financial transaction, this information may be read from the financial instrument so that the privacy preference may be honored.

If consumer 36 has already been issued a financial instrument, the consumer may indicate a privacy preference by contacting bank 37 or other organization associated with bank 37 and provide the privacy preference. Such contact may be made using any of the techniques previously described. For example, a web site may be accessed to provide the privacy preference. This information is then stored in database 46.

As previously described in connection with FIG. 2, when using a financial instrument, such as a credit card, a variety of organizations may access the personal data stored on the financial instrument. These organizations include, for example, the merchant, the merchant's bank, and the like. By including the privacy preference on the magnetic stripe, MICR number, or the like, the consumer's privacy preference is provided to such organizations and may be stored in their databases.

If the privacy preference is not stored on the financial instrument, or as a back-up measure, consumer 36 may directly contact these organizations as well. For example, as shown in FIG. 3 a merchant or merchant bank 48 may be contacted using postal system 38, phone system 40, Internet 42 using a server computer 50, or the like in a manner similar to that previously described. Once the privacy preferences are collected, they may be stored in a database 52. Although not shown, it will be appreciated that privacy preferences may be provided directly to merchants or merchant banks directly from the issuing bank 37 using technology known in the art.

For consumers with existing financial instruments, notices may be sent asking for their privacy preferences. As credit cards expire, reissued cards may be provided having the privacy preferences. Similarly, new checks may be issued with enhanced MICR numbers having the privacy preferences.

The invention has now been described in detail for purposes of clarity and understanding. However, it will be appreciated that certain changes and modifications may be practiced within the scope of the appended claims.

What is claimed is:

1. A method for protecting consumer personal data, the method comprising:
   receiving an application for a payment instrument, wherein the application comprises personal data and a privacy preference of a consumer, and wherein the application is requested before the payment instrument is issued;
   saving the application in electronic form in a database that is associated with an issuing financial institution who issued the payment instrument;
   storing at least some of the personal data and the privacy preference onto the payment instrument, wherein the payment instrument further includes consumer account information necessary to tie a debit or credit payment transaction to a consumer account that is associated with the issuing financial institution;
   receiving a purchase request at a credit or debit processing system that is associated with a merchant financial institution, wherein the purchase request is in response to presentation of the payment instrument and includes the customer account information and at least some of the personal data and the privacy preference from the payment instrument; and
   saving the privacy preference in a database associated with the merchant financial institution;
   whereby the purchase request provides the consumer account information as well as the personal data and the privacy preference from the use of the payment instrument, without separate entry of the personal data and the privacy preference from an instrument other than the payment instrument; and
   wherein the payment instrument comprises a check, and wherein the privacy preference is printed onto the check.

2. A method for protecting consumer personal data, the method comprising:
   receiving an application for a payment instrument, wherein the application comprises personal data and a privacy preference of a consumer, and wherein the application is requested before the payment instrument is issued;
   saving the application in electronic form in a database that is associated with an issuing financial institution who issued the payment instrument;
   storing at least some of the personal data and the privacy preference onto the payment instrument, wherein the payment instrument further includes consumer account information necessary to tie a debit or credit payment transaction to a consumer account that is associated with the issuing financial institution;
   receiving a purchase request at a credit or debit processing system that is associated with a merchant financial institution, wherein the purchase request is in response to presentation of the payment instrument and includes the customer account information and at least some of the personal data and the privacy preference from the payment instrument; and
   saving the privacy preference in a database associated with the merchant financial institution;
   wherein the purchase request provides the consumer account information as well as the personal data and the privacy preference from the use of the payment instrument, without separate entry of the personal data and the privacy preference from an instrument other than the payment instrument; and
   wherein the payment instrument comprises a check, and wherein the privacy preference is printed onto the check.

3. A method as in claim 2, further comprising reading the personal data and the privacy preference at a merchant location when the consumer is making a purchase using the payment instrument, and transmitting the personal data and the privacy preference to the credit or debit processing system.

4. A method as in claim 2, further comprising mailing marketing material to the consumer only if permitted by the consumer's privacy preference.

5. A method as in claim 2, wherein the privacy preference indicates that the consumer would like to receive marketing material only from merchants that the consumer does business with.

6. A method as in claim 2, wherein the privacy preference indicates that the consumer would like to receive marketing material only from merchants that the consumer does business with and their affiliates.

7. A method as in claim 2, wherein the privacy preference indicates that the consumer would like to receive marketing material only from the bank that the consumer does business with.

8. A method as in claim 2, wherein the privacy preference indicates that the consumer does not want any marketing material.

9. A method for protecting consumer personal data, the method comprising:
   providing the consumer with a payment instrument having stored thereon a privacy preference and personal data, wherein the payment instrument further includes consumer account information necessary to tie a debit or credit payment transaction to a consumer account;
   reading the privacy preference, personal data and the consumer account information from the payment instrument when making a purchase at a merchant location, wherein the consumer account information is read to provide payment to a merchant and wherein the consumer account information as well as the personal data and the privacy preference are provided from the payment instrument, without separate entry of the personal data and the privacy preference from an instrument other than the payment instrument;
   saving the privacy preference in a merchant database; and
   contacting the consumer only in accordance with the privacy preference;
   wherein the payment instrument comprises a check, and wherein the privacy preference is printed onto the check.

* * * * *